United States Patent
Vehmas et al.

(10) Patent No.: US 9,617,181 B2
(45) Date of Patent: Apr. 11, 2017

(54) METHOD OF HEATING A GLASS SHEET FOR TEMPERING

(71) Applicant: GLASTON FINLAND OY, Tampere (FI)

(72) Inventors: Jukka Vehmas, Tampere (FI); Harri Kylväjä, Pirkkala (FI); Mikko Rantala, Parainen (FI)

(73) Assignee: GLASTON FINLAND OY, Tampere (FI)

( * ) Notice: Subject to any disclaimer, the term of this patent is extended or adjusted under 35 U.S.C. 154(b) by 0 days.

(21) Appl. No.: 14/809,822

(22) Filed: Jul. 27, 2015

(65) Prior Publication Data

US 2017/0029314 A1    Feb. 2, 2017

(51) Int. Cl.
| | | |
|---|---|---|
| C03B 27/02 | (2006.01) | |
| C03B 35/24 | (2006.01) | |
| C03B 27/012 | (2006.01) | |
| C03B 35/16 | (2006.01) | |

(52) U.S. Cl.
CPC ............ C03B 27/012 (2013.01); C03B 35/16 (2013.01); C03B 35/24 (2013.01)

(58) Field of Classification Search
None
See application file for complete search history.

(56) References Cited

U.S. PATENT DOCUMENTS

| | | |
|---|---|---|
| 3,223,498 A | 12/1965 | Davidson, Jr. |
| 3,223,501 A | 12/1965 | Fredley et al. |
| 3,223,507 A | 12/1965 | Thomas |
| 3,342,573 A | 9/1967 | Fredley et al. |
| 3,409,422 A | 11/1968 | Gulotta |
| 3,449,102 A | 6/1969 | Nedelec et al. |
| 3,497,340 A | 2/1970 | Dennison et al. |
| 4,620,864 A * | 11/1986 | McMaster ........... C03B 27/0404 65/104 |
| 4,749,400 A * | 6/1988 | Mouly ................... C03B 21/04 65/105 |

(Continued)

FOREIGN PATENT DOCUMENTS

| | | |
|---|---|---|
| CN | 1562839 A | 1/2005 |
| CN | 104211288 A * | 12/2014 |
| EP | 0887180 A2 | 12/1998 |

OTHER PUBLICATIONS

CN104211288A—Machine Translation Performed by Google Patents May 6, 2016.*

(Continued)

*Primary Examiner* — Lisa Herring
(74) *Attorney, Agent, or Firm* — Buchanan Ingersoll & Rooney PC

(57) ABSTRACT

The invention relates to a method of heating a glass sheet for tempering. It comprises conveying the glass sheet on top of rollers in a roller-hearth furnace, heating the glass sheet in the roller-hearth furnace to a transfer temperature at which the glass sheet is transferred into an air support furnace. The glass sheet, while resting on an air cushion, is carried on an air support table and the glass sheet is heated in the air support furnace to a tempering temperature. The transfer temperature is not lower than 620° C. and not higher than 675° C. and the tempering temperature is not lower than 650° C. and not higher than 720° C.

6 Claims, 2 Drawing Sheets

(56) References Cited

U.S. PATENT DOCUMENTS

Figure 1:
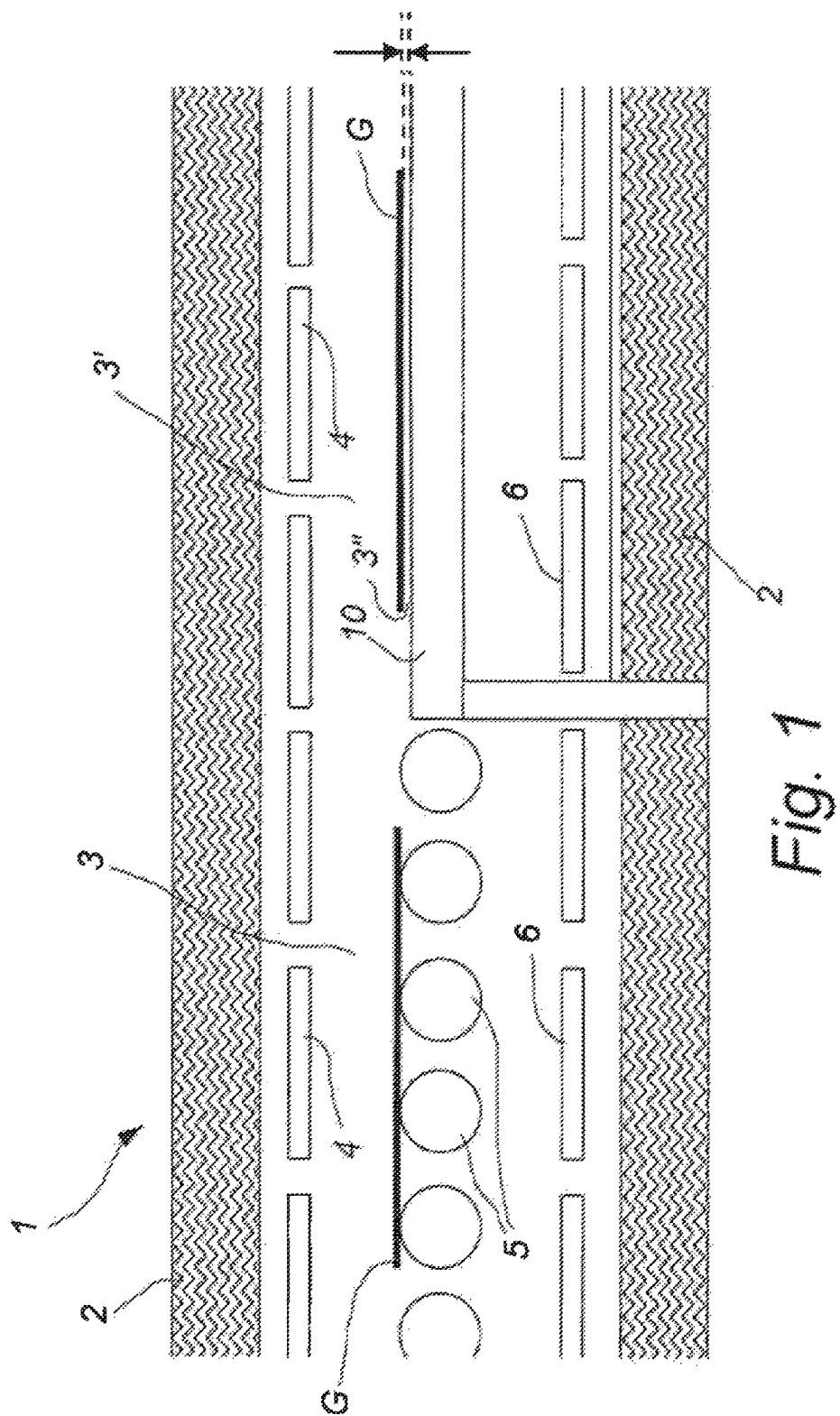

| | | |
|---|---|---|
| 5,188,651 A | 2/1993 | Csehi |
| 5,336,288 A | 8/1994 | Carlomagno et al. |
| 5,380,348 A | 1/1995 | Boaz |
| 6,053,011 A | 4/2000 | Lisec |
| 6,282,923 B1 | 9/2001 | Vehmas |
| 2011/0283528 A1* | 11/2011 | Spinner ................ F24B 1/1957 29/726 |
| 2013/0019639 A1* | 1/2013 | Saito .................. C03B 27/0404 65/114 |
| 2016/0031753 A1* | 2/2016 | Maschmeyer ...... C03B 27/0404 428/141 |

OTHER PUBLICATIONS

CN 104211288 A, English Translation, Performed by Phoenix Translations, Jun. 2016.*
Extended European Search Report issued on Dec. 11, 2015, by the European Patent Office in corresponding European Application No. 15174069.3 (11 pages, in English).
Finnish Search Report for FI 20145092 dated Sep. 30, 2014.

\* cited by examiner

METHOD OF HEATING A GLASS SHEET FOR TEMPERING

The present invention relates to a method of heating a glass sheet for tempering, said method comprising conveying the glass sheet on top of rollers in a roller-hearth furnace, heating the glass sheet in the roller-hearth furnace to a transfer temperature at which the glass sheet is transferred into an air support furnace within which the glass sheet, while resting on an air cushion, is carried on an air support table, and heating the glass sheet in the air support furnace to a tempering temperature.

In typical tempering lines (conventional float glass or soda-lime glass), the heating from room temperature to tempering temperature takes place in a furnace, wherein the glass sheet is supported by rotating ceramic rollers throughout a heating cycle. A typical furnace temperature is 700° C. Tempering temperature with glass of 3 mm thickness is generally about 640° C. Tempering temperature can be lowered as glass thickness increases, and with glass of 10 mm thickness it is about 625° C. In the furnace, the glass is resting on rollers with a spacing of about 100 mm.

The elastic sheet returns to its original shape immediately as the forced strain is released. In plastic sheet, the deformation is irreversible. Creeping refers to a timeor temperature-related permanent or plastic deformation taking place in response to a constant load or stress.

Glass begins conversion at a temperature of about 500° C. from elastic sheet into plastic. The momentary deformation inflicted in glass reverts the more slowly and to the lesser degree the higher the temperature rises. In addition, glass begins creeping under its own weight. For example in a roller-hearth furnace, the glass creeps downward over the lengths between rollers. As a result, the glass changes its shape from straight to corrugated sheet, i.e. the glass is formed with a so-called roller wave. The creeping rate increases along with glass temperature. The roller wave developed in glass depends not only on tempering temperature but also at least on heating time, a distance between rollers, and the motion speed of glass in the furnace. Even in tempered glass of 3 mm thickness, having been heated to a tempering temperature of just 640° C. in a roller-hearth furnace, it is possible to detect slight wave type distortion which the glass has developed in the roller-hearth furnace. The increase of tempering temperature to 670° C. would be enough to create in glass of 3 mm thickness a clearly noticeable wave pattern, making it no longer acceptable in terms of quality. On the other hand, the aforesaid increase of tempering temperature (640→670 C) would provide the glass with a clearly higher degree of strengthening or tempering, i.e. would increase the compressive stress of glass surface. Or, the performance of tempering fans could be reduced significantly in order to reach the same degree of tempering.

In typically heat strengthened glass, the strengthening degree is about half of that of normal tempered glass. Tempered safety glass breaks into small laceration hazardless fragments as opposed to heat strengthened glass. Tempering temperature of 640° C. is too low for the successful tempering of 2 mm thick glass, yet enables a heat strengthening of the glass. In finished glass of 2 mm thickness, heated to the tempering temperature of 640° in a roller-hearth furnace, the roller wave is more evident than in glass of 3 mm thickness. Hence, the roller wave problem increases as glass thickness reduces.

In addition to a roller wave, there is also a so-called end edge sag which increases as the tempering temperature rises from 640° C. to 670° C. in a roller-hearth furnace. End edge sag refers to a downward deflection of the leading and trailing ends of glass over the distance of 50-100 mm.

The markets for thin tempered glass of 1.7-2.6 mm thickness with an ever higher tempering degree, as required even by laceration hazardless breaking, are most likely to be found in solar energy, furniture and vehicular industries. The glass used in solar panels must be tough to withstand, among other things, mechanical impacts and a cooling shock caused by a hail shower. On the other hand, the efficiency of a solar panel improves as glass becomes thinner, since an increasing portion of solar radiation penetrates the glass and comes across the actual semiconductor cell. The glass used in furniture and vehicular industries is generally required to be safety glass, which is durable and breaks in a laceration hazardless manner. A benefit of using thinner glass therein is lightness.

In fireproof tempered glass (FRG glass=fire resistant glass), the strengthening degree is at least about 1.5 times higher than in normal tempered glass, representing a compressive stress of about 160 MPa at glass surface. A higher surface compression provides more resistance to temperature differences (thermal stresses) and thereby increases fire resistance times. FRG glass can therefore be used for retarding the spread of fire from one building, section or room to another. A typical FRG glass is 6 mm in thickness. FRG markets are being introduced with increasingly more stringent strengthening degree standards and there are new market opportunities also for slightly thinner glass thicknesses.

The compressive stress (strengthening or tempering degree), created in a tempering process at glass surface, is dependent on a temperature difference between glass surface and glass interior as the glass is cooling across a transition zone of about 600→500° C. Typically, the aforesaid temperature difference is about 100° C. and the vertical temperature profile is in the shape of a parabola. Thinner glass demands less cooling effect for obtaining the same aforesaid temperature difference. For example, the tempering of 3 mm thick glass requires per glass area about a 5 times higher cooling fan engine performance than the tempering of 4 mm thick glass. On the other hand, thinner glass cools clearly more rapidly as a result of higher cooling effect and lower thermal effect. Thus, the quenching zone need not be even nearly as long as the one required by glass of 4 mm thickness, which respectively lowers the aforesaid factor 5. In a medium-width tempering line for glass of 3 mm thickness, the overall requirement is a cooling fan engine performance of about 800 kW. Hence, the capacities are high. Energy consumption issues emerge and the high capacity increases the price of electrical components.

The raising of glass tempering temperature increases the tempering degree achieved in a tempering process, because the aforesaid temperature difference and profile have thereby more time to develop towards a more and more finished condition before the temperature of glass surface and surface layers will have been cooled to a temperature clearly below the upper limit of a transition zone.

In a roller-hearth furnace, it is relatively easy to adjust heat transfer to glass in such a way that the glass retains its straight condition in the furnace. The glass retains its straight condition in the furnace as long as its vertical temperature profile is adequately symmetrical. Perfectly symmetrical is not what is required for the temperature profile as gravity strives to keep the glass flat in contact with the rollers. Thus, the forces generated by thermal stress are required to exceed the resistance of gravity in order to cause a deflection of the glass. A symmetrical temperature profile results as the glass is supplied with the same thermal effect both from above and below. Excessively uneven heating from above and below the glass leads to a deflection of the glass. Hence, the glass may bend as a result of thermal stresses. The bending risk is reduced as temperature rises because, as the temperature difference between glass and furnace is reduced, the thermal effect passing into the glass is inherently reduced. As the thermal effect is reduced, the possible difference between top side and bottom side is also reduced and the creation of a sufficiently asymmetrical temperature profile it will be more and more difficult.

Even towards the end of heating, should the furnace experience a sudden change in its temperature or convection blasting, the deflection of glass in response to thermal stresses is possible. Generally, the furnace does not experience aforesaid sudden heating effect changes, since the furnace structure (roller-hearth furnace) is usually identical over its entire length and the adjustment is not used for stepwise changes. As the glass proceeds from the roller-hearth furnace into an air support furnace, there will be a distinct change in the furnace structure, especially below the glass. In the roller-hearth furnace, heat is transferred to a bottom surface of the glass from rollers, lower resistances, and from the furnace floor by radiation. Heat is also transferred to glass by conduction from contact points between roller and glass and by convection (the furnace comprising equipment intended for convection blasting) from air in a bottom section of the furnace. The bottom side convention is a forced convection from air jets to glass provided that convection blasting is in operation.

In the air support furnace, on the other hand, heat is transferred to a bottom surface of glass from an air support table by radiation and by convection from a thin air cushion between the glass and the table. A principal function of the air cushion is to support the glass, which is why the blasting pressure of the air support table's jets cannot be used for the adjustment of heat transfer. The heat transfer from air cushion to glass can be controlled in a limited fashion by adjusting the temperature of circulating air. On the other hand, the temperature of circulating air is also dependent on the temperature of a top section of the air support furnace and, at a crossover point, also on the temperature of a last part of the roller-hearth furnace. As a result of the change in furnace structure coinciding with the aforesaid transfer phase, there will be a stepwise change in the heat transfer of a bottom side of the glass. Further in an air support furnace, it is difficult to adjust the heat transfer in such a way that the thermal effect passing to glass is approximately equal on top and bottom surfaces of the glass. This is particularly difficult in the transfer phase as the temperature in the last part of the roller-hearth furnace has an impact also on a first part of the air support furnace.

A momentary deflection of glass in the roller-hearth furnace produces, at the most, quality defects in the glass. The air cushion has a thickness of less than 1 mm, i.e. even a slight deflection in the air support furnace brings the glass to contact with a ceramic table, thereby decelerating or even stopping the motion of glass. This results at least in serious quality defects, easily also in production stoppage, and even in furnace cooling, because the glass left in the air support furnace is awkward to remove from a hot furnace. Thus, the glass must not be allowed to sag to contact with the table in an air support furnace.

In the practical tempering process of 2 mm glass, the tempering temperature should be markedly higher than 640° C., but this cannot be implemented with just a roller-hearth furnace because the aforesaid roller waves. The glass useful as FRG glass can be provided with a sufficient tempering degree at a lower and lower cooling effect as the tempering temperature is increased. Overheating is therefore beneficial but, because of roller waves, it has its limitations even in the case of thicker glasses.

The air support table of an air support furnace consists of successive ceramic table components, which are provided with passages lateral of the furnace without discharge apertures and blasting apertures. The table components are supported on ceramic vertical wall tiles. Tolerances allowed for dimensions of the components are small, because the table must be continuous and flat. Because of the high price of the aforesaid ceramic components, the cost for one meter of air support furnace is remarkably higher than one meter of roller-hearth furnace. Thus, it is the more beneficial the higher the transfer temperature to which the glass is heated in the roller-hearth furnace. As the transfer temperature rises and the tempering temperature remains unchanged, the expensive air support furnace length will be reduced and the overall furnace cost will be lower.

It is an object of the present invention to eliminate or substantially alleviate the foregoing drawbacks.

The aforesaid object is achieved according to the present invention in such a way that the transfer temperature is not lower than 620° C. and not higher than 675° C. and the tempering temperature is not lower than 650° C. and not higher than 720° C.

In addition to the above, preferred embodiments of the invention are presented in the dependent claims.

A combination, wherein a roller-hearth furnace is followed by an air support furnace, enables the use of higher-than-before tempering temperatures, even a tempering temperature as high as 700° C. The tempering temperature of more than 720° C., particularly more than 730° C., is no longer beneficial considering the slightness of increase in tempering degree and the clear increase in problems of the process.

The purpose of an air cushion under the glass is to support the glass uniformly over its entire surface area. Hence, the glass develops neither roller wave nor other suchlike distortions at transfer temperatures and tempering temperatures of the invention as the method is applied also to thin glass sheets with a thickness of for example 2 mm. It is empirically known that in the glass tempering line, which is provided solely with a roller-hearth furnace, the glass of for example 3 mm thickness develops roller wave when the tempering temperature is 650° C. On the other hand, the tempered 3 mm thick glass, which was run with a transfer temperature of 650° C. to a tempering temperature of 680° in test runs conducted with a roller-hearth and air support furnace combination, did not have any detectable roller wave. Thus, the air support furnace at least reduces the roller wave generated in the roller-hearth furnace and even eliminates the same when the tempering temperature is higher than 650° C. At a lower glass temperature in the air support furnace, the roller wave disappears more slowly.

Figure 2:
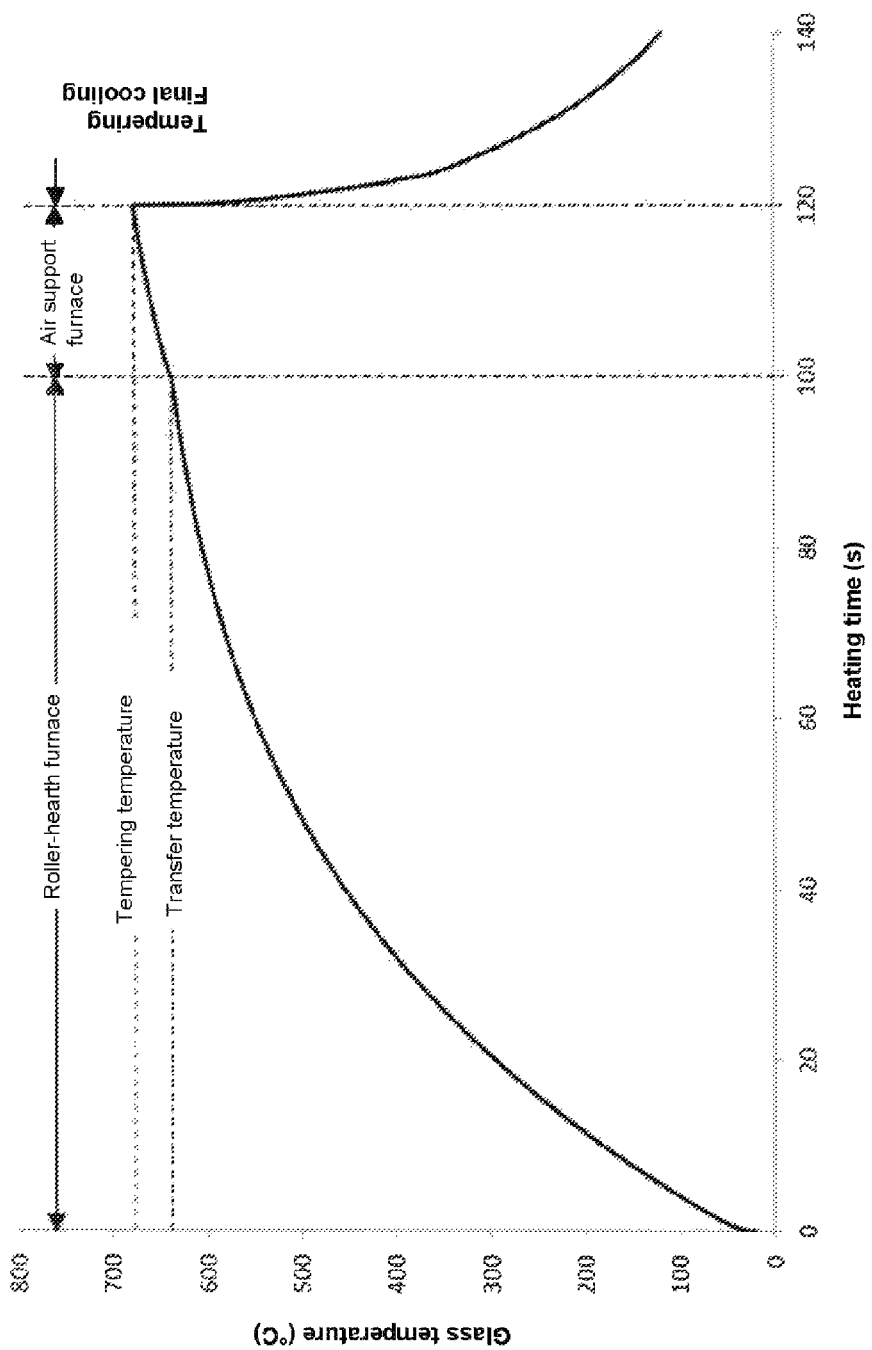

A method of the invention and a few preferred embodiments thereof will now be described more precisely with reference to the accompanying drawings, in which FIG. 1 shows schematically a furnace intended for tempering a glass sheet in order to implement a method of the invention, and FIG. 2 shows a theoretical temperature graph for one glass sheet in a tempering process.

The method can be applied in a multitude of ways within the scope of protection defined by the claim.

Thus, depicted in FIG. 1 is a tempering furnace divided in two sections, which facilitates operation according to the method. The tempering furnace is denoted with reference numeral 1. In the tempering line of FIG. 1, the heating of glass G from room temperature to transfer temperature occurs first in a roller-hearth furnace 3 (a first section of the tempering furnace), wherein the glass G travels while resting on ceramic rollers 5. For heating, the roller-hearth furnace 3 includes per se known upper heating means 4 and lower heating means 6. These comprise radiation heating means and/or convection blasting means. The final heating from transfer temperature all the way to tempering temperature takes place in an air support furnace 3' (a second section of the tempering furnace), wherein the glass G is adapted to float on top of a thin air cushion 3" present between a ceramic table or a so-called air support table 10 and the glass sheet G. The air support table 10 is inclined by 1-20°, such that the inclination pushes a side edge of the glass G to conveying rollers (not shown in the figure). The motion speed of glass G in the air support furnace 3' is equal to the peripheral speed of conveying rollers. It is especially at small angles of inclination that the friction force, with which the glass G engages the conveying rollers, is of such a low magnitude that the sagging of glass locally to contact with the table at least decelerates and even stops the motion of glass. A horizontal (0°) position for the air support table 10 is only possible if the conveying rollers have been replaced with a conveyor taking hold of the glass G. The air support table 10 includes blasting and discharge apertures (not shown in the figure). The air streaming by way of the blasting apertures to under the glass generates under the glass an overpressure with respect to a pressure existing in the furnace, providing a basis for the floating of glass G on the air cushion 3". The air departs from under the glass G by way of the discharge apertures and around edges of the air cushion 3".

It has been presented in literature that the transition temperature or conversion temperature of glass (soda-lime glass) is approximately 570° C. The temperature range of about 500° C.-600° C. is referred to as a glass transition zone or conversion zone. It is at temperatures below the transition zone that glass can be classified as a solid material and at temperatures above the transition zone as a liquid. Hence, in a glass heating process, the transition from solid to liquid does not take place abruptly at a transition temperature or conversion temperature. Transition is also dependent on time.

In the tempering furnace 1, as the glass temperature is rising from 500° C. further and further upward, the elasticity of glass keeps reducing all the time. In addition, the temperature rise reduces the time spent for the disappearance of glass stresses, i.e. the relaxation time. Hence, the aforesaid risk of deflection begins to abate dramatically. Temperature differences in the glass sheet G are no longer capable of generating equally high stresses in the glass and the resulting stresses disappear more and more rapidly. Finally, the glass sheet G does not undergo any bending or sagging at all as a result of temperature differences generated in the glass sheet G in the tempering furnace 1.

The air support table 10 is thick and it is made from a ceramic with low thermal conductivity. When the glass sheet G, which is colder than the table 10, arrives to be supported by air, a top surface of the table 10 begins rapid cooling as heat is conducted slowly from within the ceramic to its surface. The successive glass sheets G keep cooling the table 10 still further, whereby the next glass sheet 10 always experiences a heat transfer which is different from that of the preceding sheet. This is a problem in terms of the heating process stability. The increase of transfer temperature as set forth in the invention has a favorable effect also in this aspect, since the reduction in a temperature difference between the glass sheet G and the air support furnace 3' results in a slower top surface cooling of the table (10).

In prior known methods, when proceeding at a transfer temperature from a roller-hearth furnace into an air support furnace, the glass sheet experiences a stepwise change in the transfer of heat applied thereto and may sag to contact with the air support table. The transfer temperature in U.S. Pat. No. 3,409,422 is not higher than 980° F. (=527° C.) and in U.S. Pat. No. 3,223,501 it is about 950° F. (=510° C.). It has been established above that the transfer temperature is an essential factor with regard to the risk of contact-making glass deflection. In practice, it has been found that in a transfer phase the glass deflects to contact with a ceramic table at the temperature of 560° C. and easily also at the temperature of 580° C. At the temperature of 600° C., the contact-making deflection is already a rare occurrence. At the transfer temperature of 620° C., the contact-making deflection has no longer been observed. On the other hand, at the transfer temperature of 680° C., the glass is already too soft around its end zones in view of moving comfortably in the roller-hearth furnace and proceeding from the last roller onto the air support table. By this time, the glass has already developed in the roller-hearth furnace a roller wave and end edge sag too vigorous to allow its passage into the air support furnace for floating. In addition, even thin glass, which has spent time in a roller-hearth furnace at the temperature of 680° C., is quite likely to manifest other quality problems, such as for example hot spots. The term hot spots is used in reference to depressions and impurities transferring from rollers to glass. On the other hand, the glass, heated in test runs to the transfer temperature of 650° C. in a roller-hearth furnace, did not develop roller wave, not even in 2 mm thick glass, when the tempering temperature was 670° C. The transfer temperature, at which the roller wave in a roller-hearth furnace starts to emerge, increases as the glass sheet thickness increases. On the other hand, this roller wave disappears as the glass is heated in an air support furnace to a high tempering temperature, which is a precondition for obtaining a tempering degree and/or the energy efficiency of quenching pursued by the invention.

In addition, the increase of transfer temperature improves the heating process stability with the top surface of an air support table cooling less. Likewise, the increase of transfer temperature reduces furnace manufacturing costs for the above described reason. On the other hand, the higher transfer temperature does not affect the glass with a roller wave-related problem, since the roller wave generated in the roller-hearth furnace disappears or at least nearly disappears in the air support surface.

It can be stated that the object of the invention is attained with a transfer temperature of not lower than 620° C. and not higher than 675° and with a tempering temperature of not lower than 650° C. and not higher than 720° C. More preferably, the object of the invention is achieved with a transfer temperature of not lower than 630° C. (or even not lower than 640° C.) and not higher than 660° C. and with a tempering temperature of not lower than 660° C. and not higher than 700° C.

In a continuous tempering line, the glasses are moving in just one direction. The motion speed is constant almost throughout the furnace length, since it is not until at the very end of the furnace that the glasses are accelerated to a speed appropriate for quenching. In an oscillating tempering line, the glass load passes alternately from a loading table into a furnace, wherein the glass load moves back and forth until the heating time has lapsed. At this point, the glass load presently in the furnace is accelerated to a speed appropriate for quenching and at the same time a fresh glass load enters into an interior of the furnace 1. Continuous furnaces are multiple times longer than oscillating ones and capable of providing a higher production capacity. Typically, the length of a continuous furnace is at least triple with respect to an oscillating furnace. As the case may be, the continuous furnace can be shorter. The advantage of an oscillating line over a continuous one is the price of the line. A short oscillating furnace is less expensive than a long one. The oscillating line is better suitable for production involving frequent variation of glass type and thickness. A clearly dominating majority of the world's float glass tempering lines are oscillating lines.

In a line according to a preferred embodiment of the invention, the roller-hearth furnace has a heating function of heating (e.g. 2 mm thick) glass from room temperature (20° C.) to a high transfer temperature (e.g. 640° C.) of the invention. The air support furnace 3' is left with a task of heating the glass sheet G from the transfer temperature to a tempering temperature (e.g. 680° C.), which is at least 650° C. In FIG. 2 is depicted a theoretically calculated temperature graph for the case set forth above in parentheses. In the figure, the glass sheet G has a dwell time in the roller-hearth furnace of 100 seconds and in the air support furnace of 20 seconds. The air support surface 3' can therefore be clearly shorter than the roller-hearth furnace 3. The high transfer temperature of the invention reduces the length of an air support furnace and increases the length of a roller-hearth furnace. The air support furnace 3' can have a length which is shorter than what is a typical loading length in an oscillating glass tempering line. Therefore, it is advisable to construct the air support furnace in a continuous configuration. On the other hand, the length of a roller-hearth furnace can be dramatically reduced by making it oscillating or at least partially oscillating. A combination, wherein the roller-hearth furnace 3 is oscillating and the air support furnace 3' is continuous, is due to a high transfer temperature increasingly competitive in machine markets of this industry.

It is an object of the invention to enable tempering of glass particularly less than 2.7 mm in thickness to a tempering degree, which produces more than 10 fragments in a glass breaking test set forth in standard EN 12150-1. In addition, the glass is required to clear the limit values for roller wave as set forth in the aforesaid standard.

In addition to those presented above, it is an object of the invention to provide, in a manner more energy efficient than what is presently available, a tempering degree which is required by fire resistant (FRG) 6 mm glass. Another object of the invention is to enable increasing requirements of tempering degree to be set for thicker, for example 6 mm fire resistant glass, and to obtain increasingly thinner fire resistant glasses. It should be mentioned, however, that the invention is not limited solely to the aforesaid glass thicknesses. The glasses must clear the roller wave limit values as presented in the above-cited standard. Hence, according to one preferred embodiment of the invention, the glass sheet (G) has a thickness of 3.8-6.4 mm and the glass sheet (G) is tempered, as set forth in the method, for fire resistant (FRG) glass and for having a compressive surface stress of at least 160 MPa.

The invention claimed is:

1. A method of heating a glass sheet for tempering, said method comprising;
   conveying the glass sheet on top of rollers in a roller-hearth furnace,
   heating the glass sheet in the roller-hearth furnace to a transfer temperature at which the glass sheet is transferred into an air support furnace within which the glass sheet, while resting on an air cushion, is carried on an air support table, and heating the glass sheet in the air support furnace to a tempering temperature,
   wherein the transfer temperature is not lower than 620° C. and not higher than 675° C.; and
   the tempering temperature is not lower than 650° C. and not higher than 720° C.; and
   wherein the roller-hearth furnace is at least partially oscillating and the air support furnace is continuous.

2. A method according to claim 1, wherein the transfer temperature is not lower than 630° C. and not higher than 660° C.

3. A method according to claim 1, wherein the transfer temperature is not lower than 640° C. and not higher than 660° C.

4. A method according to claim 1, wherein the tempering temperature is not lower than 660° C. and not higher than 700° C.

5. A method according to claim 1, wherein the glass sheet has thickness of less than 2.7 mm.

6. A method according to claim 1, wherein the glass sheet has thickness of 3.8 - 6.4 mm and the glass sheet is tempered for fire resistant glass and for having a compressive surface stress of at least 160 MPa.

* * * * *